(12) United States Patent
Breiner

(10) Patent No.: US 8,651,499 B2
(45) Date of Patent: Feb. 18, 2014

(54) HOSE OR CABLE RELEASE ALERT SYSTEM

(71) Applicant: David E. Breiner, Glastonbury, CT (US)

(72) Inventor: David E. Breiner, Glastonbury, CT (US)

(73) Assignee: B & G Industries, LLC, Wethersfield, CT (US)

( * ) Notice: Subject to any disclaimer, the term of this patent is extended or adjusted under 35 U.S.C. 154(b) by 0 days.

(21) Appl. No.: 13/987,175

(22) Filed: Jul. 8, 2013

(65) Prior Publication Data

US 2013/0300553 A1    Nov. 14, 2013

Related U.S. Application Data

(62) Division of application No. 12/661,396, filed on Mar. 15, 2010, now Pat. No. 8,480,094.

(51) Int. Cl.
*B60Q 1/26* (2006.01)
*A62C 27/00* (2006.01)
*G08B 21/18* (2006.01)

(52) U.S. Cl.
USPC ................................... 280/4; 410/2; 340/540

(58) Field of Classification Search
USPC .............................. 280/4; 410/2, 47; 340/540
See application file for complete search history.

(56) References Cited

U.S. PATENT DOCUMENTS

| | | | | | |
|---|---|---|---|---|---|
| 3,860,027 | A | * | 1/1975 | McCain et al. | 137/899.1 |
| 4,730,180 | A | * | 3/1988 | Riddell et al. | 340/438 |
| 4,945,938 | A | * | 8/1990 | Ponsford et al. | 137/15.01 |
| 5,009,242 | A | * | 4/1991 | Prange | 134/113 |
| 5,634,487 | A | * | 6/1997 | Downey | 137/355.12 |

* cited by examiner

*Primary Examiner* — Tony Winner
*Assistant Examiner* — Jacob Knutson
(74) *Attorney, Agent, or Firm* — Ira S. Dorman

(57) ABSTRACT

An alerting system for signaling the displacement of a leading end portion of a hose or the like, carried by a vehicle, includes a hose-gripping unit, a visible or audible signal generator, and a mounting box for connecting the gripping unit to support structure. Displacement of the hose from the gripping unit may generate an alarm signal to enable the operator to immediately bring the vehicle to a stop, or it may generate a signal simply to indicate when one of several hoses has been intentionally deployed.

14 Claims, 3 Drawing Sheets

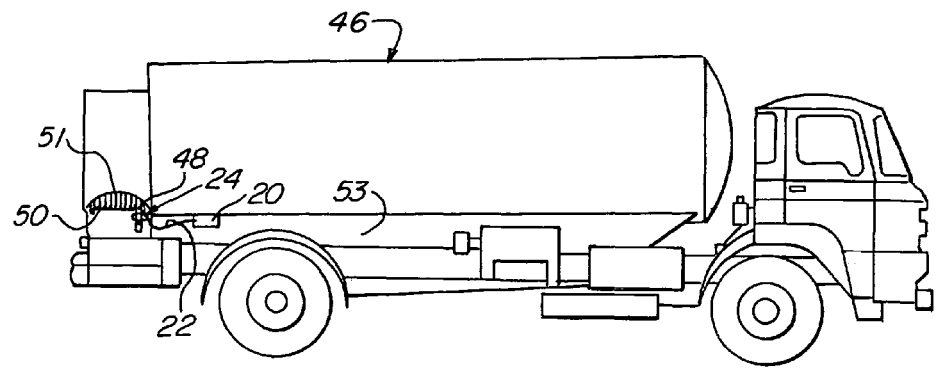
FIG. 4
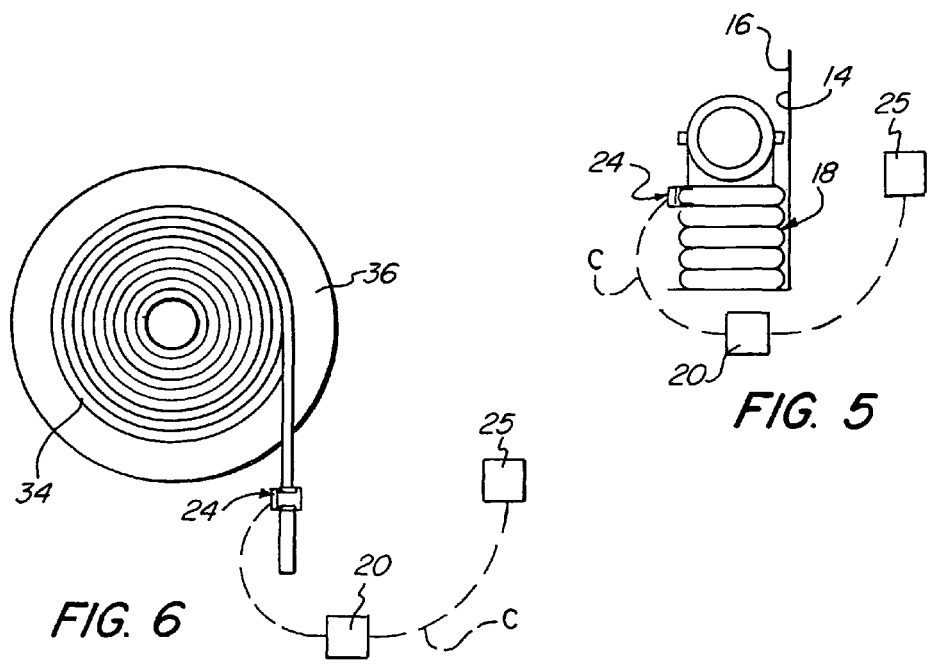
FIG. 5
FIG. 6

HOSE OR CABLE RELEASE ALERT SYSTEM

CROSS REFERENCE TO RELATED APPLICATION

This application claims the benefit of U.S. provisional patent application No. 61/337,208, entitled "Hose/Cable Release Signal Alert System," filed Feb. 1, 2010.

BACKGROUND OF THE INVENTION

The system of the present invention compliments the restraint devices that are currently used for the prevention of inadvertent displacement, from a vehicle, of a hose, cable, or other such long, flexible object. The system serves no significant restraining function, but instead serves primarily to alert personnel that displacement of the restrained object has occurred; alternatively, or in addition, the system may serve to signal personnel as to which of several monitored objects has been intentionally deployed.

The National Fire Protection Agency (NFPA) mandates, in 1901 Section 15.10.7 of the apparatus standard, that a mechanism be used to secure hoses, from the front, rear, and sides, to prevent inadvertent displacement from the beds in which they are stored on a fire truck. The tarp covers, webbing, and other devices used for securing hoses do not however always suffice. Failure may be due to wear or inherent defects in the restraining device; but it is believed that, more commonly, accidental release is a result of hasty or careless placement of the restraints provided, which can readily occur after use, particularly under urgent circumstances.

Similar concerns and problems are presented when hoses are transported by other vehicles, such as oil-delivery and tree-spraying trucks, as well as when vehicles such as utility trucks transport electrical and structural cable and other such long, flexible objects.

There are numerous reports of property damage, and of severe personal injury and even of death of bystanders, resulting from impact by a hose and or cable trailing from a moving vehicle. Such accidents happen essentially because the operator of the vehicle has no way of knowing that an inadvertent displacement has occurred, and the provision of a suitable monitoring and alerting system therefore represents a severe, unsatisfied need.

The system of the present invention adds a very substantial measure of safety under the circumstances described, by alerting the operator, or other personnel, that a hose, cable, or the like is no longer in its properly stored position. The invention obviates, or at least very substantially diminishes, the potential for injury due to the accidental release of such objects from a moving truck or other vehicle.

A hose-laying vehicle that employs a mechanical connection between a loop of hose and a switch, for activating a warning device for a predetermined period, is disclosed in Riddell et al. U.S. Pat. No. 4,730,180. The express, general object of the invention of that patent is however to alert the operator of the vehicle that substantially all of the hose to be laid has been discharged; thus, it neither teaches nor suggests the invention of the present application.

SUMMARY OF THE INVENTION

The broad objects of the present invention are to provide an alerting system for signaling that a hose, cable, or other long, flexible object has been displaced from its stored position on a vehicle; and to provide a vehicle equipped with such a system.

More specific objects of the invention are to provide such an alerting system which is highly effective for its intended purposes, which may be of incomplex and durable construction and modest cost, which is readily installed and utilized, and which is suited for a variety of applications.

It is also an object of the invention is to provide a vehicle for carrying a hose, cable, or the like, wherein the risks of injury to persons and property due to the inadvertent release of the object is eliminated or is, at least, very substantially diminished, and wherein signals indicating the status of a stored object can be generated.

It has now been found that certain of the foregoing and related objects are attained by the provision of an alerting system for signaling the displacement of a leading end portion of a long, flexible object from a stored position on a vehicle, including:

a mechanical gripping unit comprised of at least two gripping members dimensioned and configured to cooperatively grip therebetween, in direct surface contact, an end portion of a long, flexible object; means mounting the gripping members for movement between at least one first position, in which engaging elements of the gripping members are proximate one another, and at least one second position in which the engaging elements are remote from one another; and means for biasing the gripping members toward the at least one first position;

signaling means operatively connected for activation to produce an alert signal in response to displacement of the gripping members of the gripping unit from the at least one second position to the at least one first position; and attaching means operatively connected to the gripping unit for effectively connecting the gripping unit to support structure.

The gripping members of the gripping unit employed in the system will usually comprise arms having outer end portions on which the engaging elements are effectively disposed. Such engaging elements will advantageously be electrically conductive, with the signaling means of the system comprising an electrical circuit which is completed for activation, to produce an alert signal, by effective contact of the engaging elements with one another in the at least one first position. The signaling means employed in such a system will additionally comprise an electrically operated signaling device located remotely from the gripping unit.

In certain preferred embodiments, the gripping unit of the system will further comprise a housing for containment of the gripping members and having an aperture through which the gripping members may at least partially extend. More specifically, the gripping members will desirably be mounted for movement between an extended position, in which they extend through the aperture of the housing to an extent that is at least sufficient for gripping of the long, flexible object, and a retracted position in which they are either contained fully within the housing or they protrude from the housing to an extent that is substantially less than in their extended position. In such embodiments, biasing means will normally be provided for urging the gripping members toward their retracted position.

The housing of the gripping unit will advantageously be of elongate, generally tubular construction, with an open end that provides the aperture through which the gripping members extend. It will desirably be constructed, at least in part, from a material that is resiliently deformable when subjected to manually applied force, and it may be especially desirable to fabricate the housing, at least in a region surrounding the open end, from a low-friction material, which may be in the form of a rigid collar.

Other objects of the invention are attained by the provision of a vehicle for carrying a long, flexible object in a stored position, comprising at least one structure on the vehicle providing means for storing the object, and for proximately attaching a gripping unit; a long, flexible object stored by the at least one structure and having a leading end portion accessible for initiating deployment; and an alerting system including a gripping unit, signaling means, and attaching means constructed, connected, and attached as herein described.

In preferred embodiments the vehicle will be a fire truck, and the long, flexible object will be a hose. At least one structure on the fire truck will define a bed in which the hose will usually be stacked with its leading end portion typically disposed at or near the top. In most instances the bed-defining structure will comprise a plurality of generally vertical walls, to which the gripping unit-attaching means of the alerting system may be secured.

The signaling means will usually comprise an electrical circuit and a signaling device, the latter normally being located in the truck-operator's cabin and functioning to produce an alarm signal when activated. Alternatively (or additionally), signaling devices may be located on a pump panel to indicate which of several hoses has been deployed and/or charged. Elements of the gripping members (advantageously, the engaging elements) may be electrically conductive, such that the electrical circuit is completed, for activation to produce an alert signal, by effective contact of those elements with one another in, or when moving toward, the at least one first position of the gripping members. The signaling device will most desirably produce a visible signal when activated to produce an alarm.

Rather than comprising a storage bed, the "at least one structure" on a vehicle embodying the invention may comprise a rotatable, effectively cylindrical structure on which the long, flexible object is coiled with a leading end portion disposed outermost. In such embodiments the attaching means of the system will be secured to fixed structure to which the cylindrical structure is proximate.

BRIEF DESCRIPTION OF THE DRAWINGS

FIG. 4 is a side elevational view of a utility truck embodying the invention on which the present alerting system is installed;

FIG. 5 is a diagrammatic illustration of an alerting system embodying the invention, installed in association with a hose stored as a vertical stack of layers in a fragmentarily illustrated hose bed;

FIG. 6 is a diagrammatic illustration of an alerting system embodying the invention, installed in association with a coiled hose.

DETAILED DESCRIPTION OF THE PREFERRED AND ILLUSTRATED EMBODIMENTS

Figure 1:
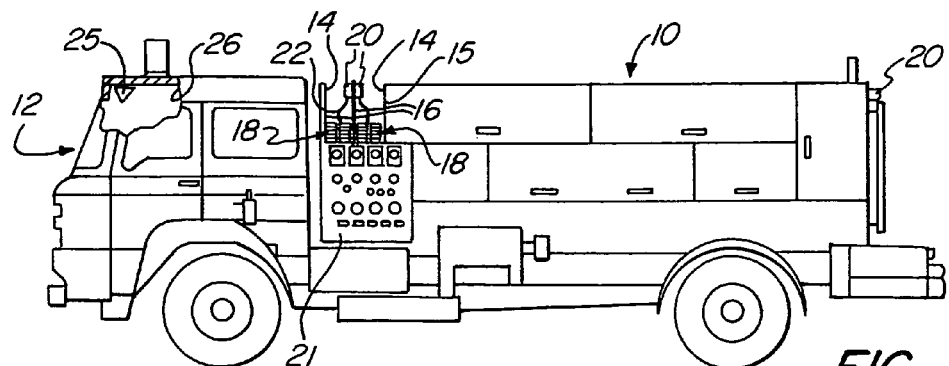
FIG. 1 is a side elevational view of a fire truck embodying the present invention, on which the alerting system of the invention is installed.
Figure 2:
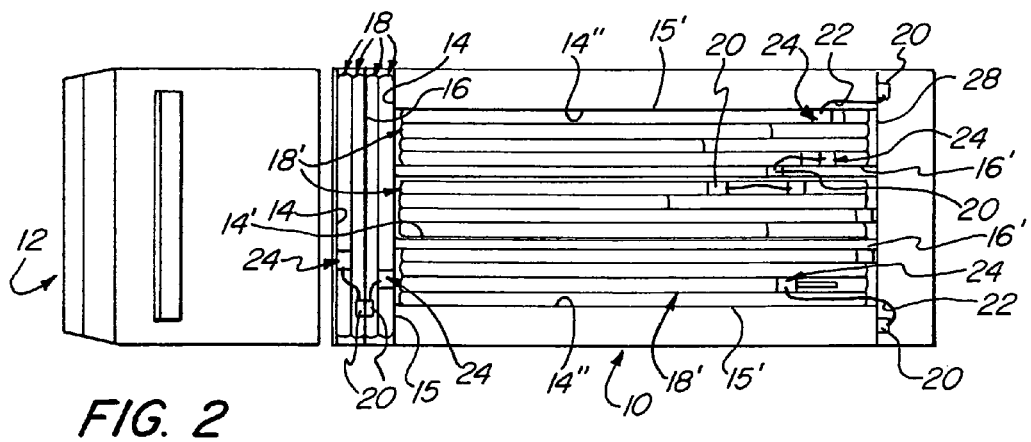
FIG. 2 is a plan view of the fire truck of FIG. 1.

Turning initially to FIGS. 1 and 2 of the drawings, therein illustrated is a fire truck embodying the present invention and including a body, generally designated by the numeral 10, and a cab generally designated by the numeral 12. Transverse and longitudinal beds 14, 14', respectively, are defined in the body of the truck by upstanding, normally vertical walls 16, 16' and vertical body panel portions 15, 15'. Stacked hoses 18, 18' are arranged in layers, with flakes lying one upon the other, between the walls and panels defining each of the beds 14, 14'. In addition to the anchor or mounting boxes 20 that are secured to the vertical walls 16, 16' defining the beds 14, 14', the mounting boxes 20 that are associated with the longitudinal beds 14" are attached to an adjacent end panel 28 of the truck body 10. Each mounting box 20 is connected by a tether 22 to a mechanical gripping unit, generally designated by the numeral 24. A signaling device 25, for producing an alarm signal, is mounted within the cabin 26 of the cab 12 and is operatively connected to receive signals from all of the mounting boxes 20 (by means not shown, but hereinafter described). The mounting boxes 20 are also operatively connected (by means also not shown) to the pump panel 21, which includes signal lights and gauges to indicate the status (e.g., of charging or deployment) of each hose, thereby avoiding the need for the pumper driver to make a direct, visual check.

Figure 3:
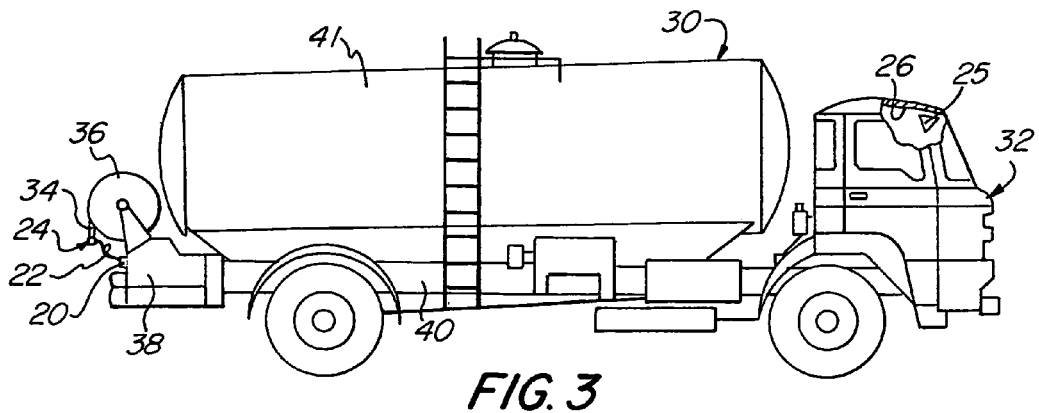
FIG. 3 is a side elevational view of an oil-delivery truck embodying the invention, on which the present alerting system is installed.

FIG. 3 illustrates an oil-delivery truck, and FIG. 4 illustrates a utility truck, both embodying the present invention. The oil-delivery truck includes a body, generally designated by the numeral 30, comprised of a chassis 40 on which is supported an oil tank 41. It also includes a cab, generally designated by the numeral 32, in the cabin 26 of which is mounted an alert signal device 25.

A length of hose 34 is wound upon a spool or reel 36, or other effectively cylindrical take-up and payout structure, rotatably mounted by supporting structure 38 affixed to the chassis 40 of the truck body 30. Here again a tether 22 is fastened at one end to a gripping member 24 which is, in turn, attached to the free end portion of the hose 34; the opposite end of the tether 22 is fastened to a mounting box 20, secured to the support structure 38. The gripping member 24 is operatively connected (by means not shown), for generating an electrical signal, for activating the alert signal device 25, when it is disconnected from the hose 34.

In similar fashion a reel or spool 50 is rotatably mounted on structure at the rear of the utility truck body, generally designated by the numeral 46, and supports a roll of cable, generally designated by the numeral 51. A gripping member 24 is attached to the free end portion of the cable 48, and is tethered, by element 22, to a mounting box 20 secured to the chassis 53; here again, signal-generating means (not shown) is incorporated.

FIGS. 5 and 6 diagrammatically illustrate the system of the invention utilized to monitor hoses 18 and 34 in stacked and rolled form in the bed 16 and on the reel 36, respectively. The dash line "C" in FIG. 5 shows a circuit electrically connecting the gripping member 24 on the top flake of hose 18 to an anchor box 20, and connecting the box 20 to an alert signal device 25. Needless to say, release of the hose 18 causes the gripping member 24 to effect closing of the circuit "C," and thereby to activate device 25. Similarly, release of the hose 34 from the gripping device 24 in FIG. 6 effects closing of the circuit "C," to the same effect.

Figure 7:
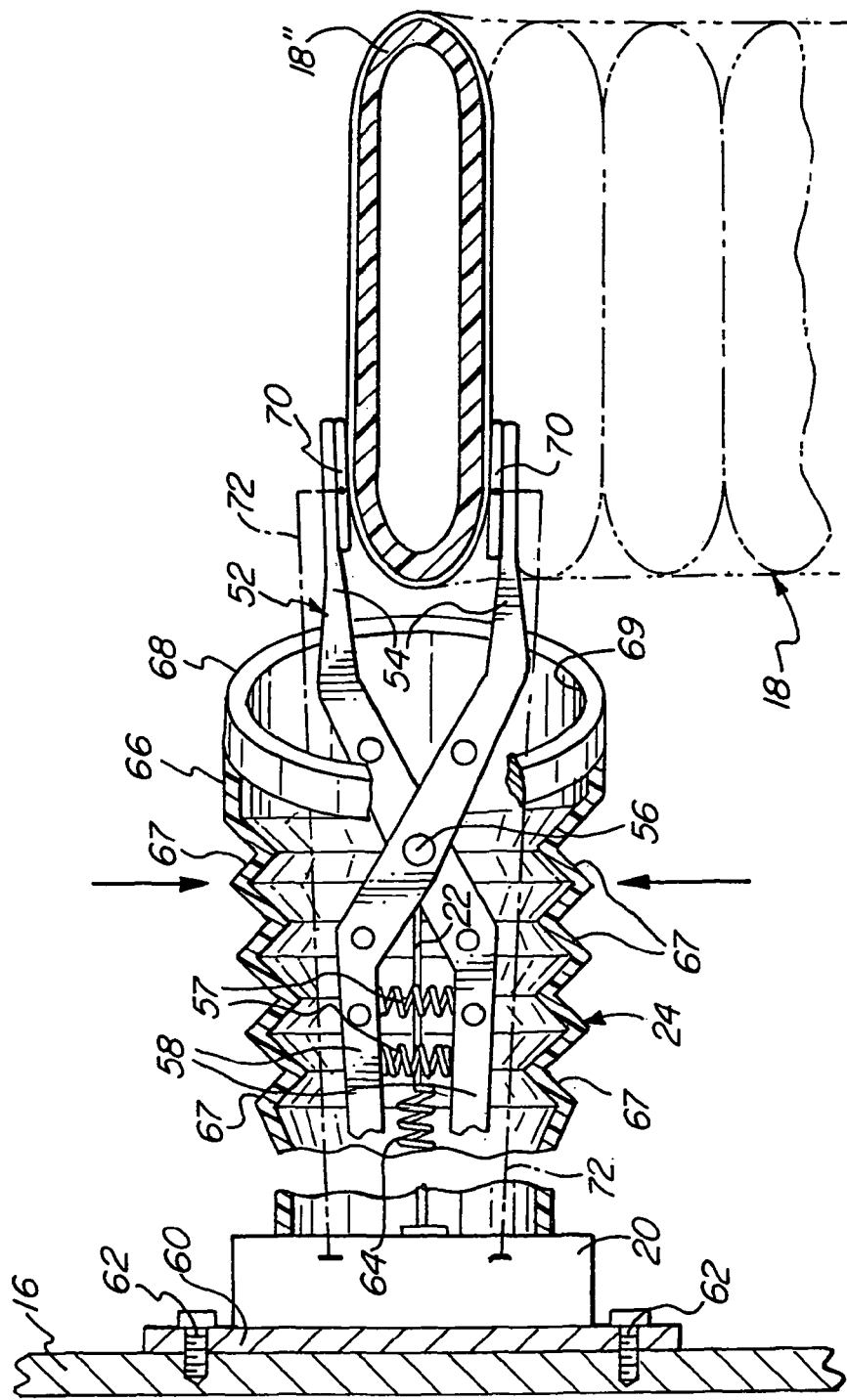
FIG. 7 is a fragmentary, diagrammatic illustration of components of an alerting system embodying the invention, including a gripping unit comprised of a tongs-like device gripping the end portion of a hose disposed in the uppermost "flake" or layer of a stack.

Turning now in detail to FIG. 7 of the drawings, therein illustrated is a gripping unit, generally designated by the numeral 24, which is representative of means that is suitable for use in the present system for establishing a releasable attachment to the end portion of a long, continuous object, and for initiating a release-alert signal in accordance herewith. The unit 24 comprises a pair of tongs or pincers, generally designated by the numeral 52, consisting of arms or jaws 54 pivotably connected to one another by a pin or axle 56. Two coil springs 57 are mounted between handle portions 58 of the arms 54, and serve to bias the arms to a closed position in which engaging elements 70, at the ends of the gripping portions of the arms 54 defined outwardly of the pivot element 56, are in contact with one another.

The mounting or anchor box 20 includes a plate 60 by which it is fastened to the vertical wall 16 using, for example, screws 62. One end of a length of tethering cable 22 is attached to the pivot pin or axle 56 that couples the arms 54 of the tongs assembly 52 to one another, with the opposite end of the cable being affixed to the plate 60 of the mounting box 20. The tethering cable 22 incorporates a coil spring element 64, which serves to exert an inward force to bias the tongs assembly 52 toward the mounting box 20.

Also joined effectively to the plate 60 is a generally cylindrical, resiliently deformable housing or sleeve 66 (shown in cross section), which is formed with a series of circumferential pleats 67 along its length to facilitate longitudinal extension and compression. The housing 66 will typically be made from a tough and durable elastomeric material, or from a tough and durable fabric (such as woven nylon) containing an imbedded coil spring (not illustrated) for urging the housing toward an extended configuration. In the illustrated embodiment the housing is also radially compressible, at least in the section indicated by the opposing arrows in FIG. 7, so as to allow transmission of manual force to the handle portions 58 of the arms 54 and thereby to cause their outer end portions to extend from the housing 66 and to assume an open position for receiving the hose therebetween. In some instances, the housing 66 may be compressed longitudinally, to expose the arms 54 for gripping a hose, with reliance being placed upon the natural tendency of the housing to resume a normal, extended position so as to enclose the arms 54 when the hose is released (i.e., obviating, or supplementing, the use of, for example, the coil spring section 64 to effect retraction).

A collar or ring 68 (fragmentarily illustrated), normally formed from a hard, low-friction plastic material (e.g., nylon or TEFLON), is provided at the forward end of the sleeve 66, surrounding its open end 69. The collar 68 serves to keep the forward end of the sleeve open, and facilitates retraction of the arms 54. It also ensures uninhibited movement of the hose past the gripping unit, as is most important for ensuring rapid and trouble-free deployment. Although not illustrated, the housing 66 may alternatively be constructed to exert a closing force on the clamping arms 54; for example, in place of any rigid collar or ring, a garter spring may encircle its open end 69. Also, the entire housing may be made from a low-friction material to minimize any inhibition to movement of the gripping members therein or of the monitored object thereby.

The free, forward end portions of the gripping arms 54 are provided with pads or elements 70, which serve not only to engage and grip the hose in direct surface contact but also to function as sensor plates for activation of the alert system. In the embodiment illustrated, the pads 70 are electrically conductive and constitute electrical contacts or electrodes, which are connected, through wires 72, to an appropriate electrical component (e.g., a solenoid, not shown) contained within the mounting box 20.

In its normal, operative relationships depicted in FIG. 7, the alert system is armed to initiate a signal upon displacement of the hose from between the engagement pads 70, which otherwise bear upon the opposite sides of the top hose flake 18" and grip it therebetween. It will be evident that, upon displacement of the flake 18" the coil springs 57 will force the outer end portions of the arms 54 to a closed position, causing the engagement elements 70 to contact one another directly. This will in turn close the circuit provided, via the wires 72, and will thereby activate the signaling device 25 to generate a signal and thus alert personnel that the end portion of the hose flake has been displaced from its safely stored position.

It should be appreciated that the means by which a closed (or closing) condition of the arms can be detected can take any appropriate form, as will be evident to those skilled in the art. For example, cooperating electrical contacts can be provided at any suitable position along the lengths of the arms, and they might be so constructed and disposed as to complete the electric circuit well ahead of the time the engagement elements 70 actually contact one another; indeed, movement of the gripping arms may function to open a circuit in a suitable actuating arrangement. Motion detectors, optical sensors, and the like, disposed at any effective location (e.g., on the arms 54 or within the housing 66), might for example also serve to generate a signal that is indicative of the absence of the gripped object.

Many other variations can of course be made in the system of the invention without departure from the scope of the appended claims. For example, any suitable signaling device, be it visual, audible, or both, and any suitable transmitting system for initiating the alert signal, be it hard-wired or wireless, analog or digital, may be employed. The signaling unit may be located at any appropriate position on the vehicle, albeit in most instances it will be mounted within the driver's cabin so as to enable his immediate reaction to stop the vehicle in response to an alarm signal; as discussed above, however, signals produced at a pump panel may also provide crucial information.

The particular form of the gripping unit employed will depend, to an extent, upon whether the object being monitored is a hose, a cable, or other monitored object, but it should satisfy most, if not all, of the following criteria: Perhaps most importantly, the gripping members must be readily attached to the monitored object, not only under calm circumstances but also under urgent conditions that require a fast and efficient response, such as to prepare, in haste, for departure from a location of use. Convenience and facility of attachment are also important due to the fact that the leading end portion of, for example, a fire hose may not be readily accessible and may, indeed, be buried in a stack and/or wedged in a tight bed. The gripping unit should not be easily lost or disconnected from the vehicle, to ensure its ongoing availability, and it should be sufficiently strong and durable to survive rough handling throughout an extended period of use.

The gripping unit and components should be as unobtrusive as possible, and should function by gripping the monitored object directly, without need for any cooperating part attached to the object itself In addition to requiring alignment to enable coupling with the gripping members, such an added part could inhibit deployment, such as by becoming snarled. Moreover, fire fighters depend upon features of the hose sections (e.g., male and female connectors) to guide escape from a conflagration (often under pitch-black conditions), and added components could create confusion and critical misdirection.

While the mounting or anchoring unit may take any suitable form, it must also be so constructed as to avoid interference with the free and rapid deployment of a fire hose (or other object). Proper placement of the mounting box is also crucial; if, for example, the arrangement is such that the gripping mechanism will be elevated above the hose in its released position, and/or that it will freely dangle from an end panel of the truck body (rather than being located directly over a hose bed), the possibility of interference will be substantially reduced.

Retraction of the gripping members can be effected in any suitable way. As a further example, rather than (or in addition to) relying upon a spring element integrated into the tether and/or the longitudinal resilient compression and extension of a housing, one end of the tether, connecting strip, strap, or the like may be wound upon a spool, with take-up being powered by a spring motor or an electric motor. Actuation of the motor could be initialed in reaction to withdrawing force exerted upon the monitored object, or by the same signal that activates the alerting device.

Finally, it will be appreciated that the system of the invention may be incorporated during vehicle manufacture or it may be designed for retrofitting to equip existing vehicles, as would be highly desirable given the present critical need. Needless to say, however, circuitry and other features of the system may, as a practical matter, require integration into the body and/or cab of a vehicle, thus making after-market applications unfeasible.

Thus, it can be seen that the present invention provides a novel alerting system for signaling that a hose, cable, or other long, flexible object has been inadvertently displaced from its stored position on a vehicle, and it provides a vehicle equipped with such a system. The alerting system is highly effective for its intended purposes, it may be of incomplex and durable construction and modest cost, it is readily installed and utilized, and it is suited for a variety of applications; valuable signals, indicative of the status of hoses and the like, can be generated by the system as well. The invention also provides a vehicle for carrying a hose, cable, or the like, wherein the risk of injury to persons and property, due to the inadvertent release of a length of the object, is eliminated or is, at least, very substantially decreased, and wherein signals indicating the status of a stored object may be generated as well.

Having thus described the invention, what is claimed is:

1. An alerting system for signaling the displacement of a leading end portion of a long, flexible object from a stored position on a vehicle, comprising:
   a mechanical gripping unit comprised of at least two gripping members dimensioned and configured to cooperatively grip therebetween, in direct surface contact, an end portion of a long, flexible object; means mounting said gripping members for movement between at least one first position, in which engaging elements of said gripping members are proximate one another, and at least one second position in which said engaging elements are remote from one another; means for biasing said gripping members toward said at least one first position; and a housing for containment of said gripping members and having an aperture through which said gripping members may at least partially extend, said gripping members being mounted for movement between an extended position, with said gripping members extending through said aperture of said housing to an extent that is at least sufficient for gripping of the long, flexible object, and a retracted position with said gripping members contained either fully within said housing or protruding from said housing to an extent that is substantially less than in said extended position;
   signaling means operatively connected for activation to produce an alert signal in response to displacement of said gripping members of said gripping unit from said at least one second position to said at least one first position; and
   attaching means operatively connected to said gripping unit for effectively connecting said gripping unit to a support structure.

2. An alerting system for signaling the displacement of a leading end portion of a long, flexible object from a stored position on a vehicle, comprising:
   a mechanical gripping unit comprised of at least two gripping members dimensioned and configured to cooperatively grip therebetween, in direct surface contact, an end portion of a long, flexible object; means mounting said gripping members for movement between at least one first position, in which engaging elements of said gripping members are proximate one another, and at least one second position in which said engaging elements are remote from one another; means for biasing said gripping members toward said at least one first position; and
   signaling means operatively connected for activation to produce an alert signal in response to displacement of said gripping members of said gripping unit from said at least one second position to said at least one first position; and
   attaching means operatively connected to said gripping unit for effectively connecting said gripping unit to a support structure.

3. The system of claim 2 wherein said gripping members comprise arms.

4. The system of claim 3 wherein said means for biasing comprises at least one spring.

5. The system of claim 3 wherein said engaging elements are disposed on outer end portions of said arms.

6. The system of claim 2 wherein said engaging elements are electrically conductive, and wherein said signaling means comprises an electrical circuit which is completed for activation to produce the alert signal by effective contact of said engaging elements with one another in said at least one first position.

7. The system of claim 6 wherein said signaling means further comprises an electrically operated signaling device located remotely from said gripping unit.

8. The system of claim 2 wherein said gripping unit further comprises a housing for containment of said gripping members and having an aperture through which said gripping members may at least partially extend.

9. The system of claim 8 wherein said gripping members are mounted for movement between an extended position, with said gripping members extending through said aperture of said housing to an extent that is at least sufficient for gripping of the long, flexible object, and a retracted position with said gripping members contained either fully within said housing or protruding from said housing to an extent that is substantially less than in said extended position.

10. The system of claim 9 wherein said a second biasing means is provided for urging said gripping members toward said retracted position thereof.

11. The system of claim 8 wherein said housing is of elongate, generally tubular construction and has an open end providing said aperture.

12. The system of claim 11 wherein said housing is constructed, at least in part, from a material that is resiliently deformable when subjected to manually applied force.

13. The system of claim 11 wherein said housing is comprised of a low-friction material, at least in a region surrounding said open end.

14. The system of claim 13 wherein said housing further includes a rigid collar, which provides the low friction material in said surrounding region.

* * * * *